Sept. 1, 1931. E. F. TERRY, JR 1,821,732
TOOL RETAINER
Filed March 14, 1929 2 Sheets-Sheet 1

Inventor,
Edward F. Terry, Jr.
By
Attorney

Sept. 1, 1931.  E. F. TERRY, JR  1,821,732
TOOL RETAINER
Filed March 14, 1929   2 Sheets-Sheet 2
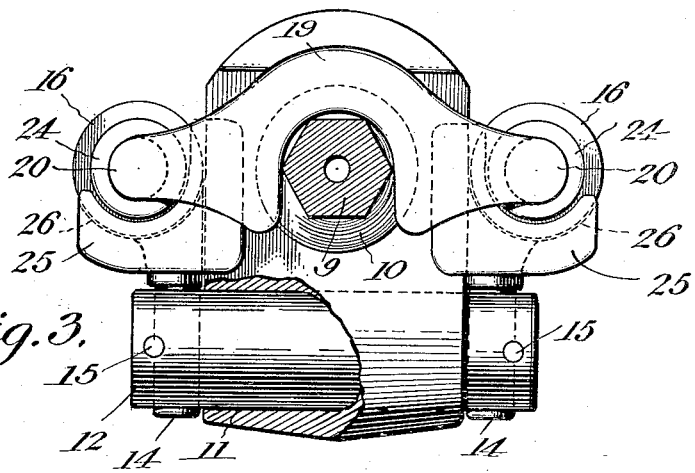
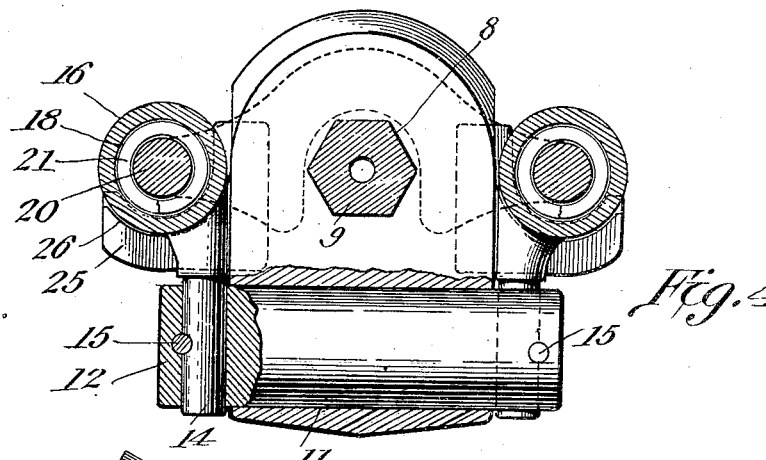
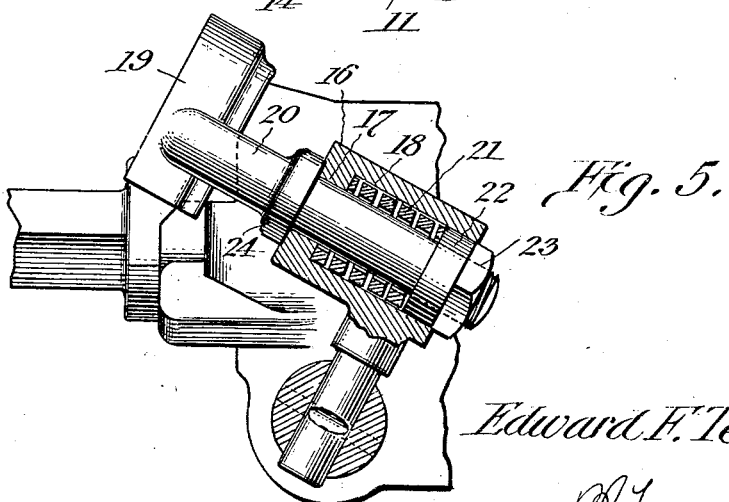
Inventor,
Edward F. Terry, Jr.
By
Attorney Patented Sept. 1, 1931

1,821,732

UNITED STATES PATENT OFFICE

EDWARD F. TERRY, JR., OF DENVER, COLORADO, ASSIGNOR TO GARDNER-DENVER COMPANY, OF DENVER, COLORADO, A CORPORATION OF DELAWARE

TOOL RETAINER

Application filed March 14, 1929. Serial No. 347,025.

The object of the present invention is to provide a novel form of retainer in which the tool-engaging member or yoke has side arms so positioned and held that their line of movement is parallel to that of the steel and substantially in the same plane thereof. Experience has demonstrated that this produces a very satisfactory structure, in that there is a straight line pull upon the side arms when struck by the collars of the tool.

In the accompanying drawings:

Figure 3 is a front elevation with portions broken away.

Figure 4 is a sectional view on the line 4—4 of Figure 2.

Figure 5 is a detail sectional view on the line 5—5 of Figure 1, but illustrating the retainer in its inactive position.

Figure 1:
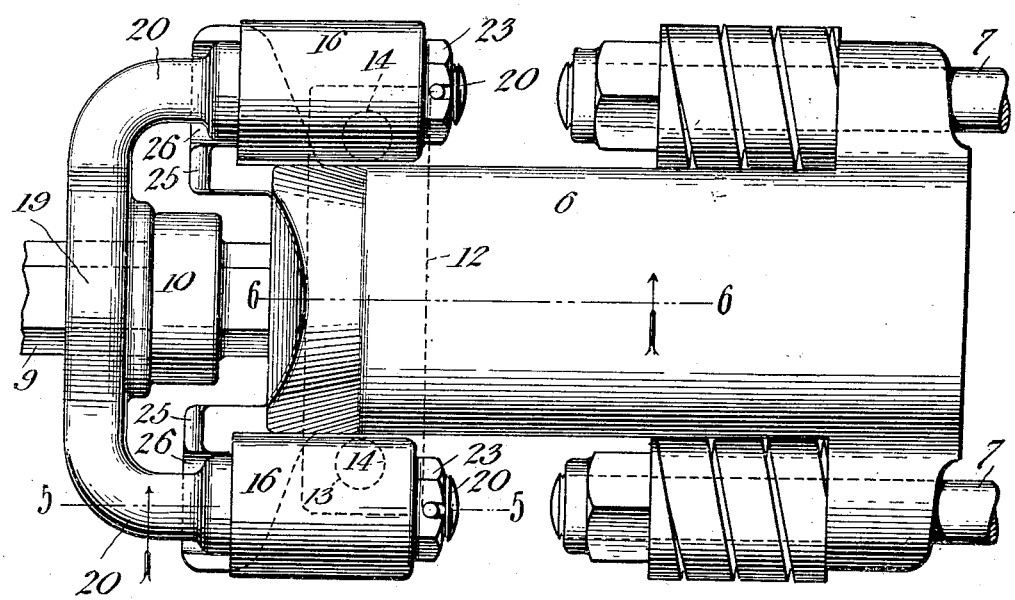
Figure 1 is a plan view of an embodiment of the present invention.

In the embodiment disclosed a tool holder is shown, and designated generally by the reference numeral 6. This, as usual, is connected by side bolts 7 to the front end of a drill and is provided with a socket 8 to receive the shank of a drill steel 9, said steel having a collar 10. The holder 6 is provided at one side of the socket and at its front end with a transverse opening 11, forming a pivot mounting in which is journaled a rock shaft 12 that projects beyond opposite ends of the holder. Said projecting ends are provided with transverse openings 13.

In the openings 13 are stems 14 fixed by suitable pins 15, and carrying heads 16 that are disposed longitudinally of and on opposite sides of the tool holder 6, preferably in the same plane as the socket that receives the steel 9. These heads 16, as shown particularly in Figure 5, are provided with openings 17 therethrough that are counterbored to form sockets 18. A tool-retaining yoke 19 is provided with side arms 20 that pass through the openings 17 and through the sockets 18. In said sockets are coiled springs 21 surrounding the arms 20, abutting at their front ends against the end walls of the sockets and borne against at their rear ends by plunger collars 22 carried by the side arms and slidable in the sockets 18. The collars 22 are held in place by nuts 23 on the rear ends of the arms. The rearward movements of the arms in the heads 16 are limited by stop flanges 24 formed on the side arms 20 and abutting the front ends of said heads.

Figure 2:
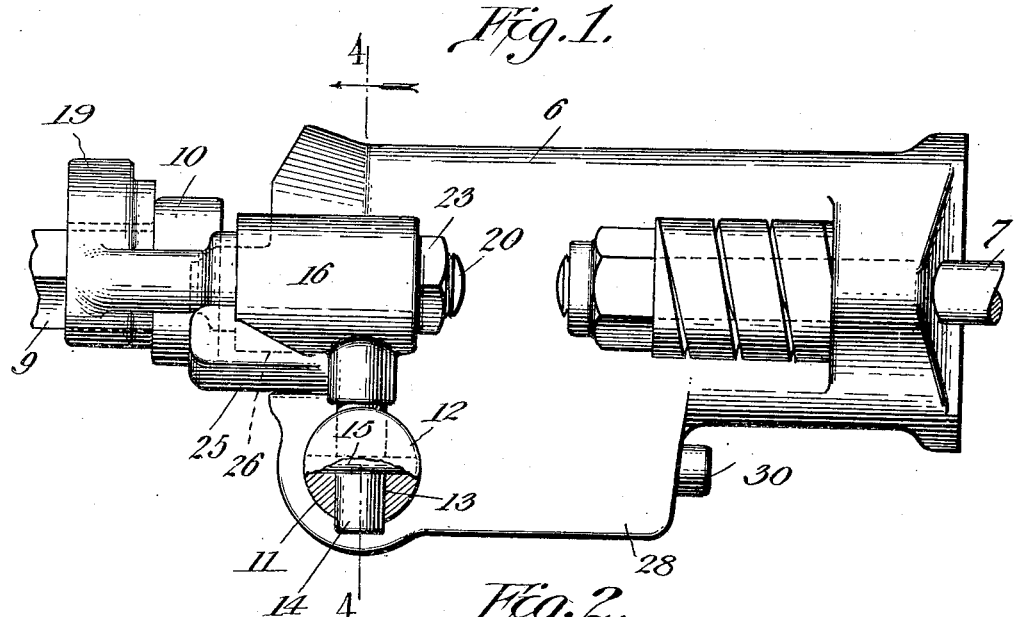
Figure 2 is a side elevation of the same.

As will be clear, the yoke 19 can be swung to a position where it embraces the drill steel 9 in advance of the collar 10, and the space within the yoke being less than the diameter of the collar 10, the tool 9 is thus held against detachment from the holder. On the other hand the yoke, as indicated in Figure 5, can be swung to a position where it no longer is in the path of the collar 10, whereupon the tool may be removed from the socket or placed therein. Moreover it will be noted by reference to Figures 2 and 3 that when the yoke is in its active position around the steel 9, the side arms 20 extend rearwardly in parallel relation to the steel and in the same plane as said steel, so that the strain or pull upon the yoke is transmitted parallel to the steel. In order to resist this strain as it is transmitted to the head 16, the tool holder 6 is provided with outstanding projections 25 recessed as indicated at 26 to form seats for the forwardly projecting portions of the head 16. The front walls 26 of these seats are abutted against by the front ends of the head 16, and consequently firm abutments are provided for the heads, so that there is practically no strain upon the rock shaft 12.

Figure 6:
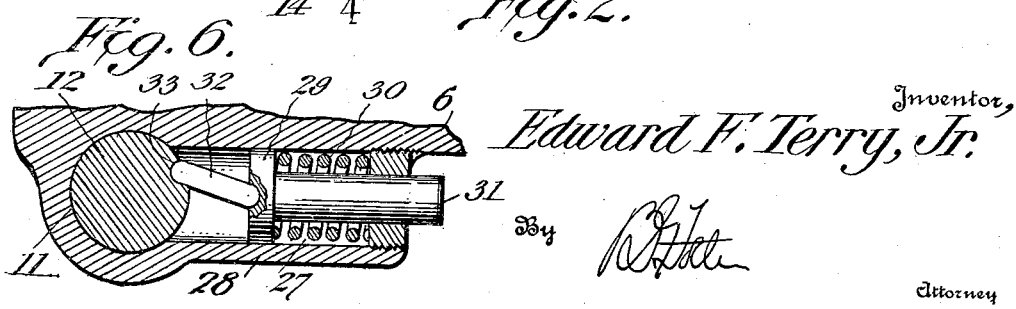
Figure 6 is a detail sectional view on the line 6—6 of Figure 1.

In order to hold the yoke in its operative and inoperative position the device shown in Figure 6 is preferably employed. The transverse opening 11 intersects a rearwardly extending chamber 27 formed in an enlargement 28 on the under side of the tool holder 6. In this chamber is a plunger 29 forced forwardly by a spring 30 behind it and having a stem 31 that projects from the rear side of the enlargement 28. A dog or pawl 32, pivoted on the plunger 29, has an engagement in a seat 33 formed in the rear side of the rock shaft 12 and when the rock shaft is turned, obviously this plunger will swing to oppositely inclined positions and thus hold the yoke either in embracement with the tool or in an inactive position.

From the foregoing, it is thought that the construction, operation and many advantages of the herein described invention will be apparent to those skilled in the art without further description, and it will be understood that various changes in the size, shape, proportion and minor details of construction may be resorted to without departing from the spirit or sacrificing any of the advantages of the invention.

What I claim, is:

1. The combination with a tool holder having a tool-receiving socket, of a shaft journaled on the holder at one side of the socket, transversely disposed arms carried by the shaft and located on opposite sides of the holder, said arms having transversely disposed openings substantially parallel to and on opposite sides of the socket in the plane therewith, and a tool-retaining yoke in advance of the socket and having side arms extending from points between its upper and lower sides and slidably and yieldingly mounted in the openings.

2. The combination with a tool holder having a tool-receiving socket and a transverse opening at one side of the same, of a rock shaft journaled in the opening and having transverse openings in its end, stems engaged in the openings, heads on the stems having openings therethrough on opposite sides of the tool holder, a yoke having side arms slidable in the heads, springs on the arms resisting the sliding movements of the yoke, and abutments for the heads formed in the tool holder in advance of the heads and acting to withstand the pulling strains of the yoke on said heads.

In testimony whereof, I affix my signature.

EDWARD F. TERRY, Jr.